(12) United States Patent
Ott

(10) Patent No.: US 12,175,958 B2
(45) Date of Patent: Dec. 24, 2024

(54) SOUND AMPLIFYING CASE FOR A MOBILE ELECTRONIC DEVICE

(71) Applicant: John F. Ott, Bernhards Bay, NY (US)

(72) Inventor: John F. Ott, Bernhards Bay, NY (US)

(73) Assignee: MVPCASE LLC, Bernhards Bay, NY (US)

( * ) Notice: Subject to any disclaimer, the term of this patent is extended or adjusted under 35 U.S.C. 154(b) by 0 days.

(21) Appl. No.: 17/694,392

(22) Filed: Mar. 14, 2022

(65) Prior Publication Data

US 2022/0301532 A1 Sep. 22, 2022

Related U.S. Application Data

(60) Provisional application No. 63/160,286, filed on Mar. 12, 2021.

(51) Int. Cl.
*G10K 11/02* (2006.01)
*H04M 1/04* (2006.01)
*H04M 1/215* (2006.01)

(52) U.S. Cl.
CPC ............... *G10K 11/02* (2013.01); *H04M 1/04* (2013.01); *H04M 1/215* (2013.01)

(58) Field of Classification Search
CPC ......... G10K 11/02; H04M 1/04; H04M 1/215
USPC ......................................................... 181/187
See application file for complete search history.

(56) References Cited

U.S. PATENT DOCUMENTS

| | | | | |
|---|---|---|---|---|
| 9,266,664 B2 * | 2/2016 | Bau | ........................ | B65D 85/00 |
| 2012/0273541 A1 * | 11/2012 | Zwach | ................... | A45C 13/30 |
| | | | | 224/220 |

FOREIGN PATENT DOCUMENTS

CA 2796321 A1 * 10/2011 ............. F16M 11/00

OTHER PUBLICATIONS

VAT19 still, created Jul. 23, 2022 from YouTube video available at https://www.youtube.com/watch?v=uddwiG_vFdA, still is 1 page, video dated 2010 (Year: 2010).*

* cited by examiner

*Primary Examiner* — Daniel L Murphy
(74) *Attorney, Agent, or Firm* — BOND, SCHOENECK & KING, PLLC; George R. McGuire

(57) ABSTRACT

A case that includes an acoustic horn and a microphone input therein to enhance the sound emitted from and input into a smart phone.

7 Claims, 24 Drawing Sheets

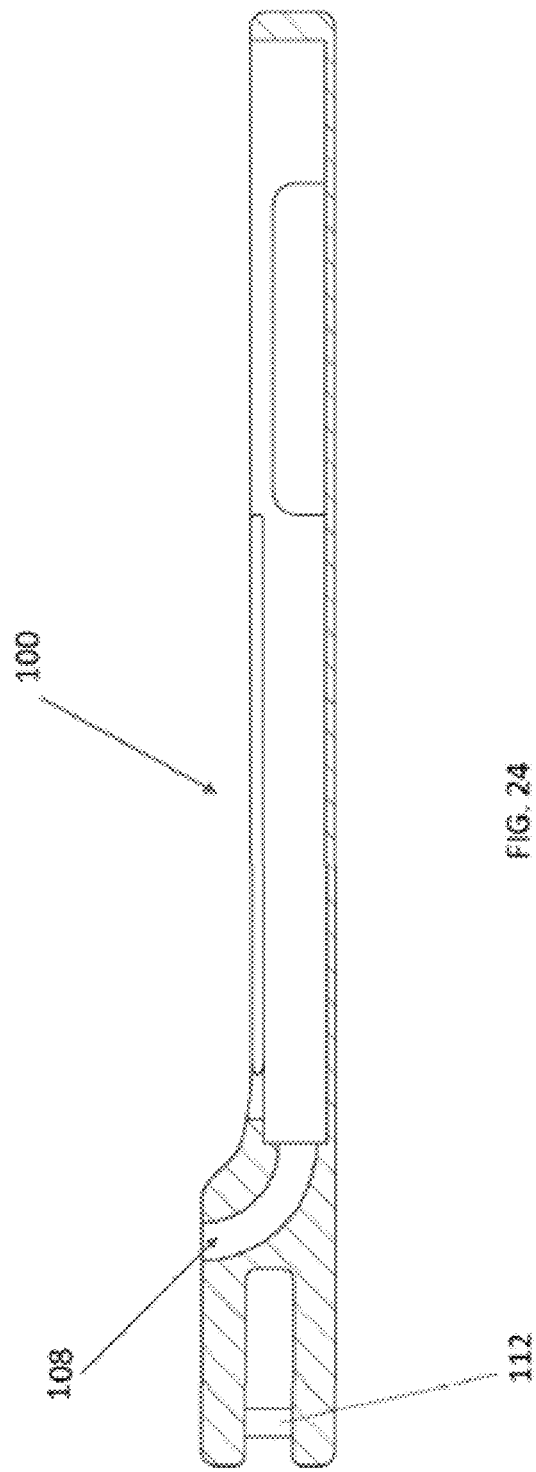

SOUND AMPLIFYING CASE FOR A MOBILE ELECTRONIC DEVICE

CROSS-REFERENCE TO RELATED APPLICATION

The present application relates and claims priority to U.S. Provisional Patent Application Ser. No. 63/160,286, filed Mar. 12, 2021, the entirety of which is hereby incorporated by reference.

FIELD OF THE INVENTION

The present disclosure is directed generally to cases for portable devices having a microphone and speaker, and more particularly to cases that amplify the sound emitted from such portable devices and improve microphone performance.

BACKGROUND

Mobile electronic devices, such as smart phones and tablets for example, contain a speaker to emit the sounds coming from the device, such as phone calls, music, movies, etc. Due to size limitations of the mobile device the level of sound the speakers are capable of emitting is also limited and the orientation is less than ideal for maximum performance. While the sound level is generally suitable for personal listening in a quiet environment, there are instances where it would be beneficial or desirable to have the speakers emit an amplified sound beyond what they are otherwise capable of emitting. Remote conferencing, while maintaining social distancing, has become more necessary and routine. The microphone improvement is critical for conferencing and hands free operation.

Accordingly, there is a need in the art for a device that amplifies the sound emitted from a mobile device and improves the microphone performance.

SUMMARY

The present disclosure is directed to a sound amplifying case for a mobile electronic device which also improves microphone performance.

According to an aspect is a sound amplification device for an electronic device having at least one speaker, comprising a case in which the electronic device is adapted to be contained defined, in part, by a wall positioned adjacent to at least one speaker when the electronic device is contained within the case, wherein a baffle is positioned within the one wall and forms a tapered opening that diverges as it extends from a position adjacent the speaker away therefrom. The space within the baffle forms an expanding horn, the mouth of which is smaller than the speaker opening in the phone. This restriction, at the interface between the horn and the phone, increases the sound pressure at the mouth. This increase in pressure improves efficiency of the horn while minimizing the overall size of the device.

According to an embodiment, the sound amplification device further comprises a second wall positioned adjacent the microphone when the electronic device is contained within the case, wherein sound waves are compressed as they approach the microphone, thus increasing the sensitivity of the microphone.

According to an embodiment, the sound amplification device further comprises a clip that moves between closed and open positions relative to the case and which permits, when in its open position, the electronic device to be moved into or out of the case, and when in its closed position, encloses the electronic device within the case and further provides a force against the electronic device that urges the electronic device into abutting relation with the first and second walls.

According to an embodiment, the sound amplification device further comprises a stand that is pivotally connected to the exterior of the case and permits the case to be placed on a surface such that the display surface of the electronic device is in a non-horizontal plane.

According to an embodiment, the sound amplification device incorporates a horn to capture sound waves and improve microphone performance.

According to an aspect is a sound amplification device for an electronic device having at least one speaker, a microphone, and a display surface, the sound amplification device comprising a case in which the electronic device is adapted to be contained and defined, in part, by a first wall positioned adjacent the at least one speaker when the electronic device is contained within the case; an interface formed on the first wall in the area surrounding the position where the at least one speaker is contained within the device, and a speaker opening formed through the first wall aligned with a baffle is positioned within the first wall and aligned with the speaker; and at least one sound horn adapted to be attached to the interface and in surrounding relation to the speaker opening.

According to an embodiment, the sound amplification device further comprises a manifold adapted to be attached to the interface, the manifold comprising a sound channel through which sound waves can travel.

According to an embodiment, the sound amplification device further comprises a plurality of sound horns, each connected to the manifold.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 24 is a cross-section view taken along section line I-I of FIG. 15, in accordance with an embodiment.

DETAILED DESCRIPTION OF EMBODIMENTS

The present disclosure describes a sound amplification device for an electronic device.

Figure 1:
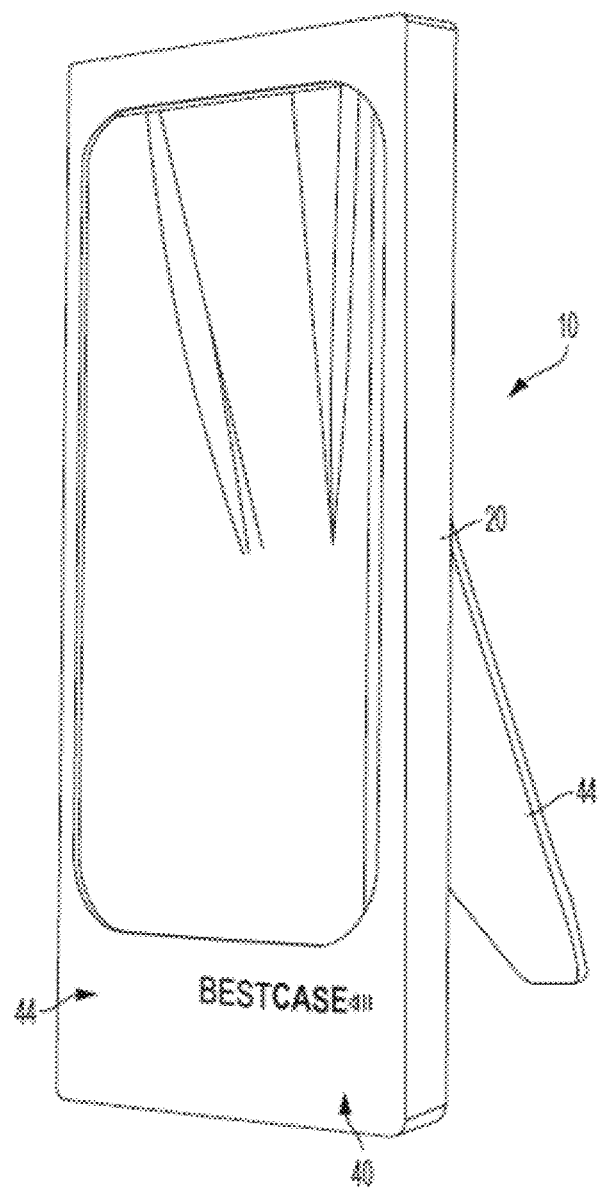
FIG. 1 is a perspective view of a sound amplification device for an electronic device, in accordance with an embodiment.
Figure 2:
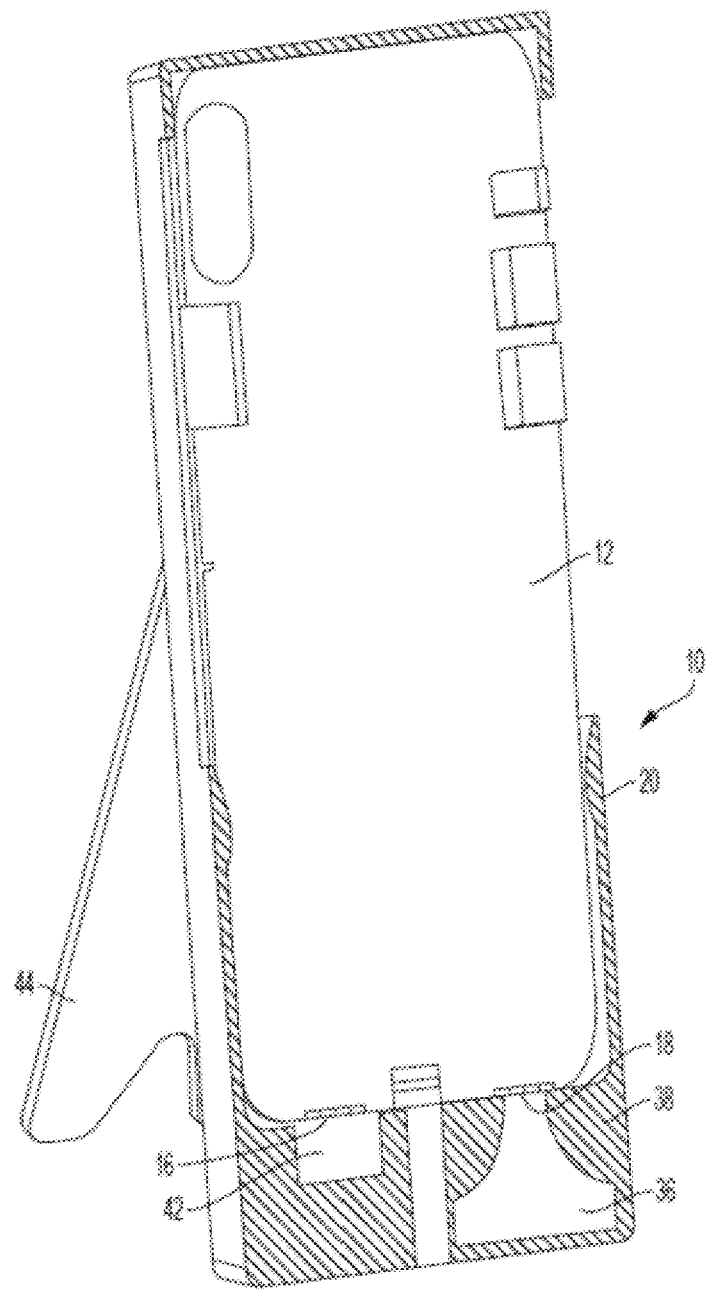
FIG. 2 is a partial cross-section view of a sound amplification device for an electronic device, in accordance with an embodiment.
Figure 3:
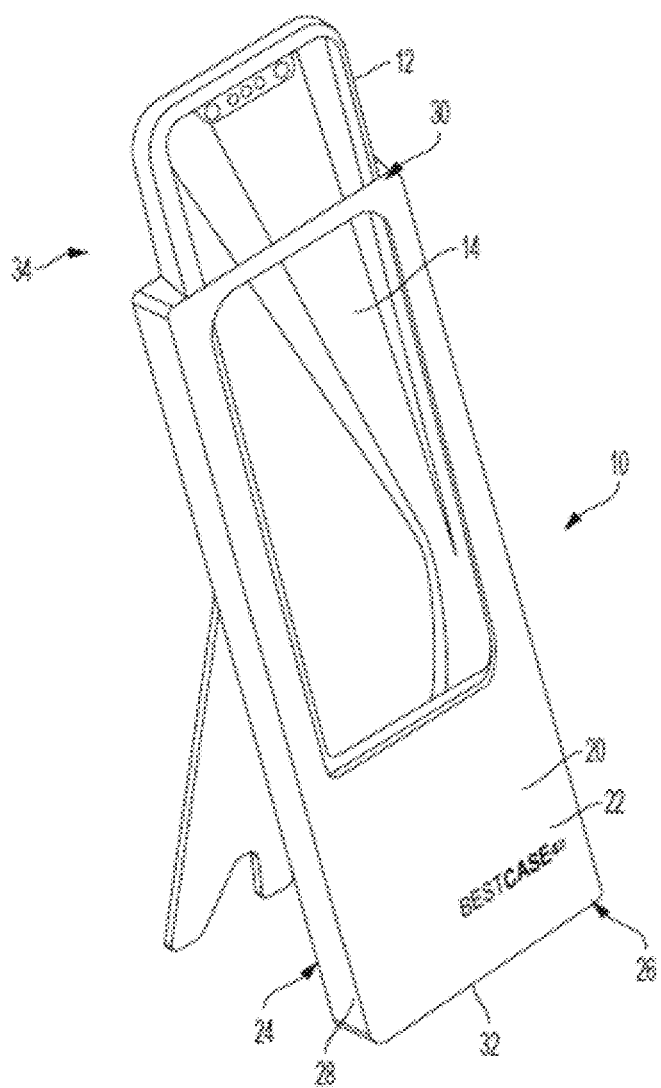
FIG. 3 is a perspective view of a sound amplification device for an electronic device positioned on a surface in a horizontal orientation, in accordance with an embodiment.
Figure 4:
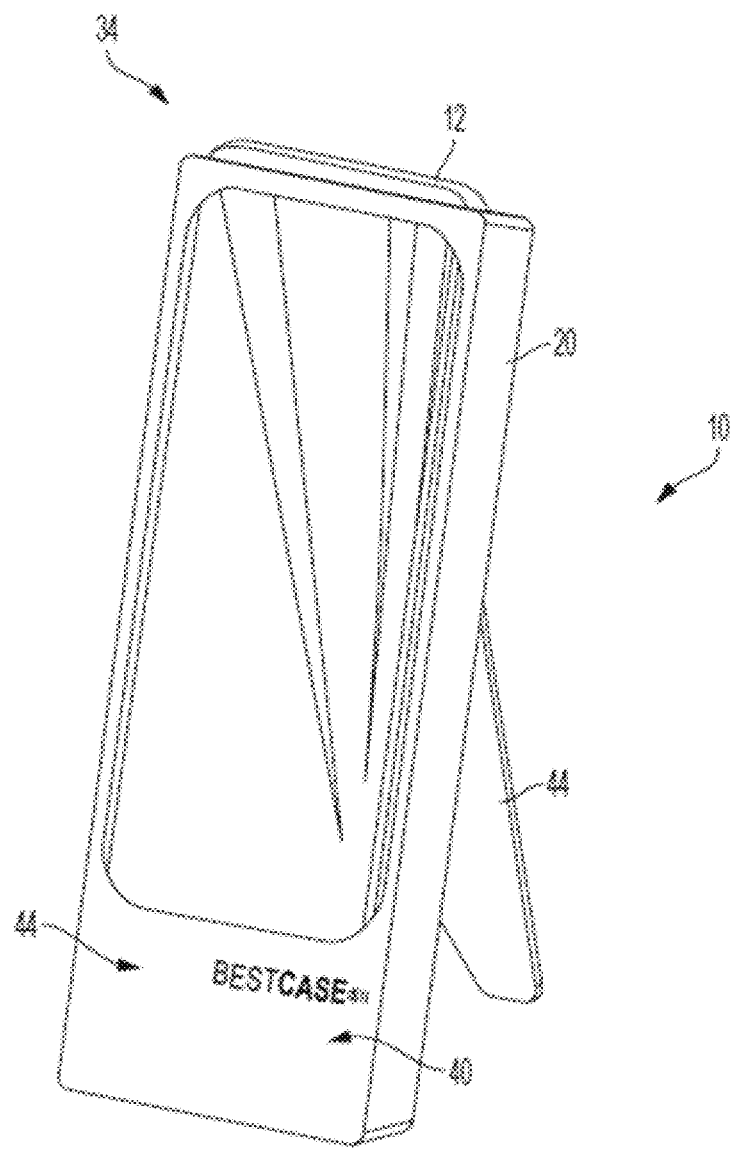
FIG. 4 is a perspective view of a sound amplification device for an electronic device positioned on a surface in a vertical orientation and with a clip in an open position and the electronic device contained within the amplification device, in accordance with an embodiment.
Figure 5:
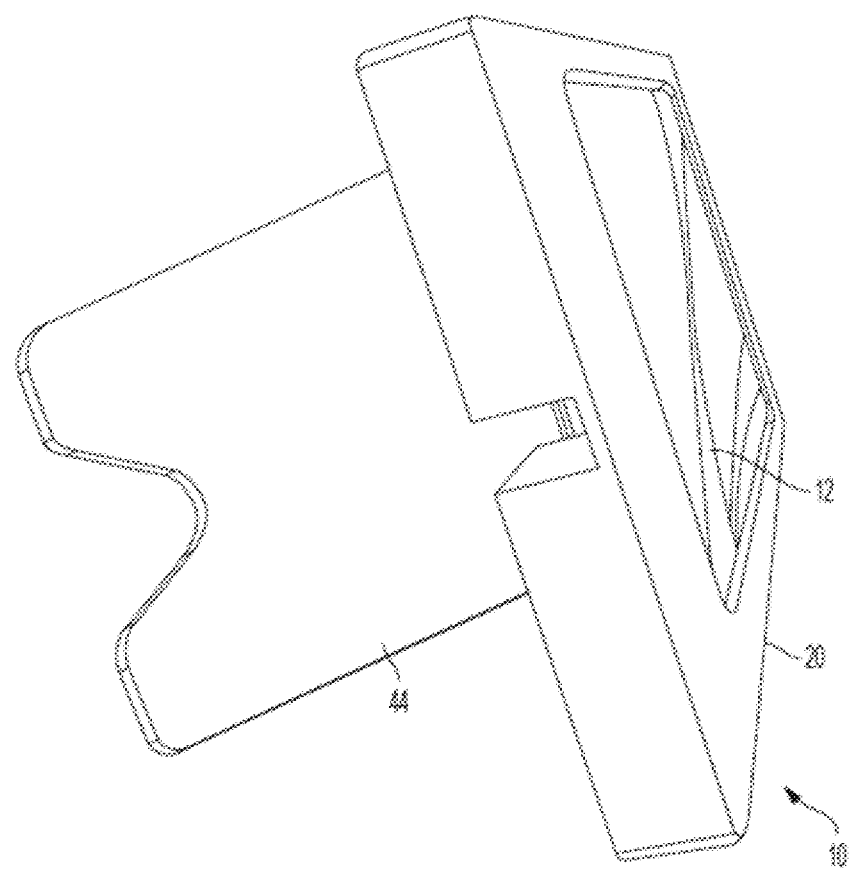
FIG. 5 is a perspective view of a sound amplification device for an electronic device positioned on a surface in a vertical orientation and with a clip in an open position and the electronic device partially removed from within the amplification device, in accordance with an embodiment.
Figure 6:
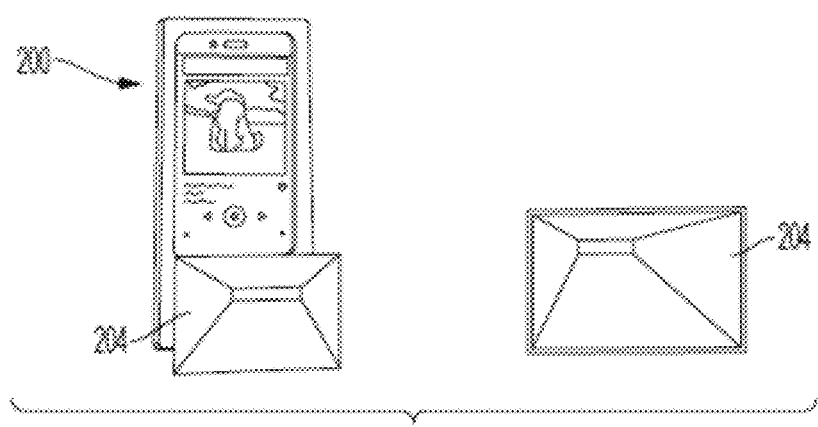
FIG. 6 is a perspective view of a sound amplification device for an electronic device with a sound horn attached and a sound horn accessory next to it, in accordance with an embodiment.

Referring to FIG. 1, in one embodiment, is a sound amplification device, designated generally by reference numeral 10, for use with a conventional electronic device 12, such as a smart phone, it being understood that the device could be used with any sort of mobile electronic device. Electronic device 12 is characterized by a display surface/screen 14, a microphone 16, and a speaker 18, all of which are readily understood in the art.

Sound amplification device 10 comprises a case 20 in which electronic device 12 is adapted to be contained. Case 20 includes front and rear surfaces 22, 24, respectively, opposing side surfaces 26, 28, and a top and an enclosed bottom 30, 32. In one embodiment, top 30 is defined by a clip 34 that is attached at one edge to side surface 26 and is pivotally movable towards and away from the opposing side surface 28 such that it can enclose or open top 30 and electronic device 12 can be securely contained within or manually removed from/placed within the confines of case 20. In another embodiment, electronic device 12 simply snaps into case 20 by snapping it through the front surface.

The interior of case 20, adjacent bottom 30, is defined by an acoustic horn 36 (formed by baffling) that is positioned adjacent the speaker 18 when the electronic device 12 is contained within case 20. Acoustic horn 36 is defined by a baffle 38 formed in the interior of case 20 that tapers outwardly in a direction from the speaker towards the exit 40 that is formed on the front face of case 20. Note that the mouth of horn 36 is smaller in dimension than the opening of speaker 18 in order to increase the pressure near horn 36 and further amplify the emitted sounds.

A sound gathering region 42 (formed by baffling) is formed in the interior of case 20 in the area adjacent microphone 16. An opening 44 formed on the front surface of case 20 permits incoming sound to enter the case and the sound gathering region 42 and direct the sound waves towards microphone 16 to enhance its reception.

The clips and case exert a pressure to force the electronic device against the horn and microphone 45 providing a tight seal to minimize any air pressure leaks and maximize the horn efficiency.

A stand 44 is pivotally mounted to the back surface of case 20 and permits the case to be stood on a surface with the display surface of the electronic device in either a horizontal or a vertical orientation.

Figure 7:
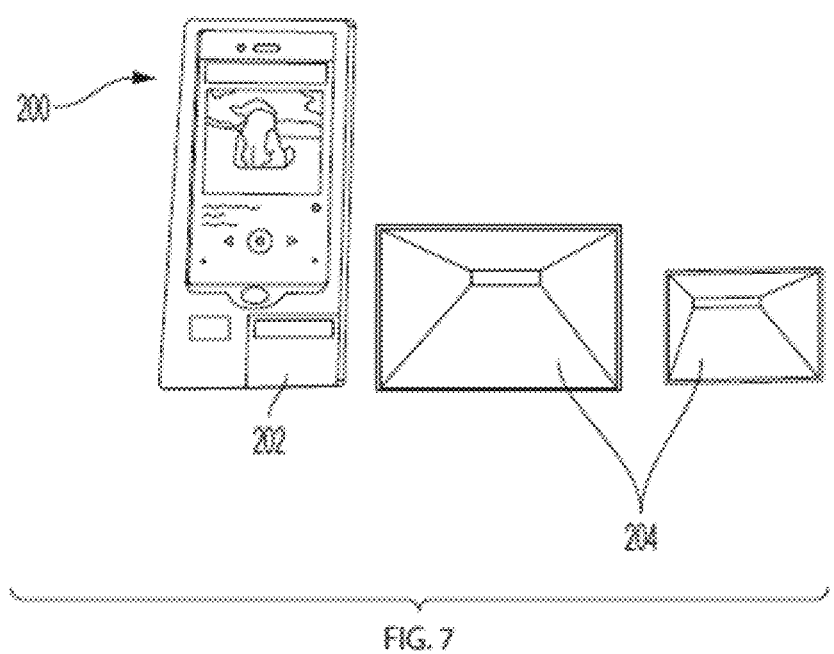
FIG. 7 is a perspective view of a sound horn for use with a sound amplification device for an electronic device with sound horn accessories next to it, in accordance with an embodiment.
Figure 8:
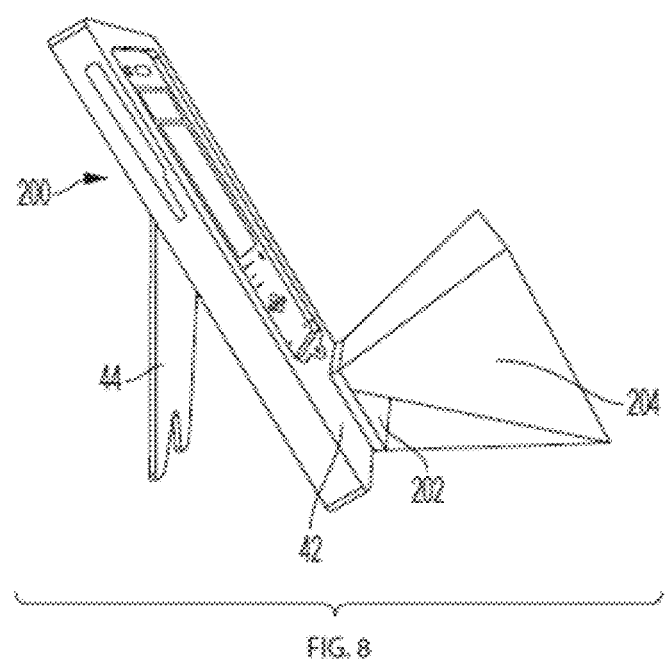
FIG. 8 is a side elevation view of a sound horn attached to an amplification device for an electronic device, in accordance with an embodiment.
Figure 9:
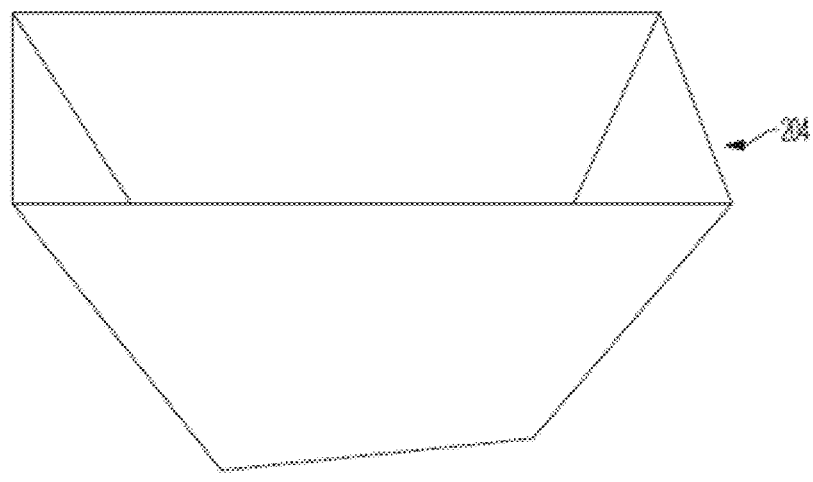
FIG. 9 is a perspective view of a sound horn for use with a sound amplification device for an electronic device, in accordance with an embodiment.
Figure 10:
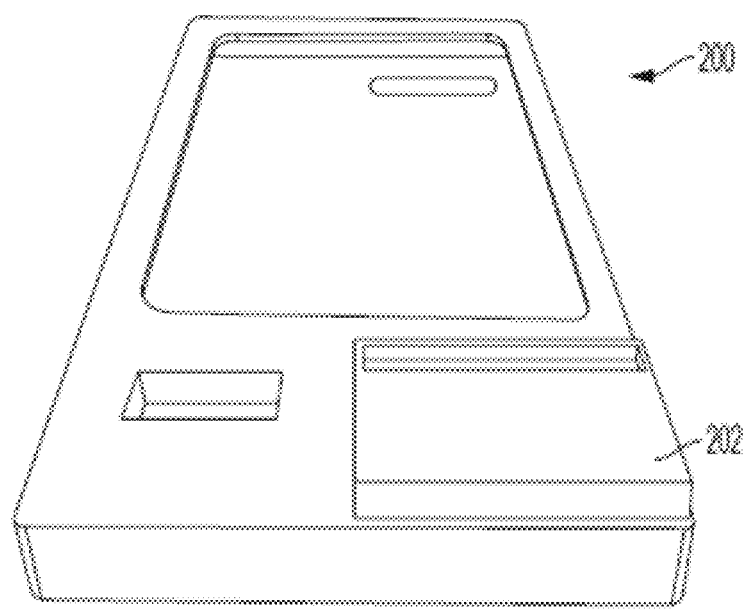
FIG. 10 is a perspective view of a sound amplification device for an electronic device, in accordance with an embodiment.
Figure 11:
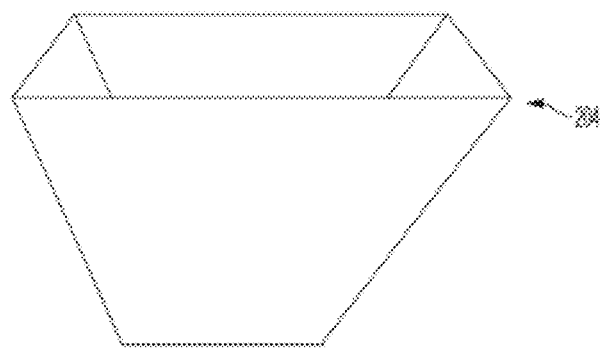
FIG. 11 is a perspective view of a sound horn for use with a sound amplification device for an electronic device, in accordance with an embodiment.

Referring to FIGS. 6-8 and 10, a phone case 200 includes an interface element 202 formed around the acoustic horn 204 of sound amplification device 10 that permits modular accessories, such as differently sized sound horns 204 (see FIGS. 6, 7, 9 and 11), to be attached to interface 202. Horns 204 further amplify the sounds emanating from a phone carried by case 200. With reference to FIG. 7, a series of acoustic horns 204 can be attached to interface 202 to increase the volume and extent of sound being emitted. Each horn 204 slides into the interface 202.

Figure 12A:
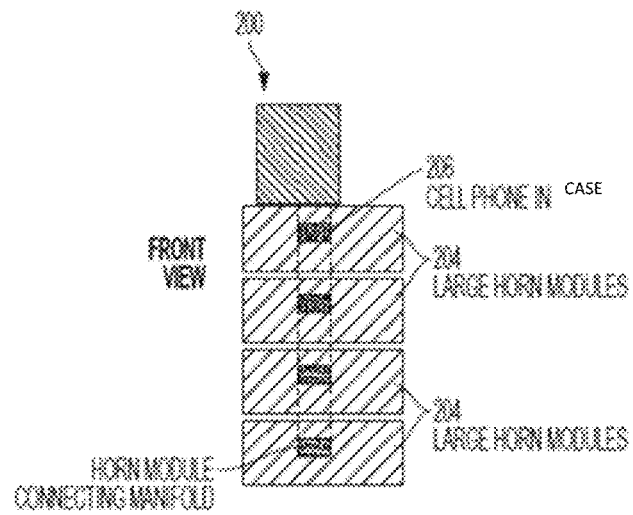
FIGS. 12A, 12B, and 12C are front, side, and top elevation views of a sound amplification device for an electronic device, in accordance with an embodiment.
Figure 12B:
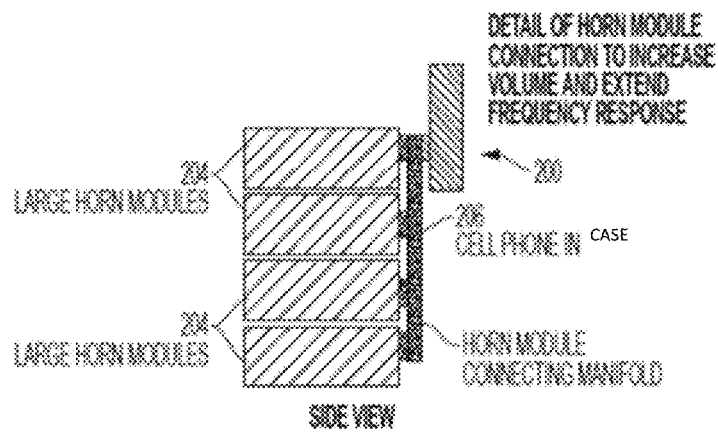
Figure 12C:
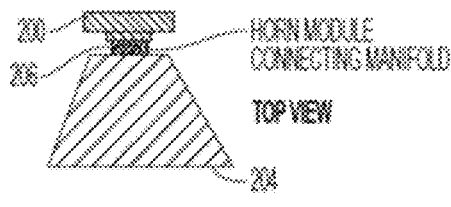
Figure 13:
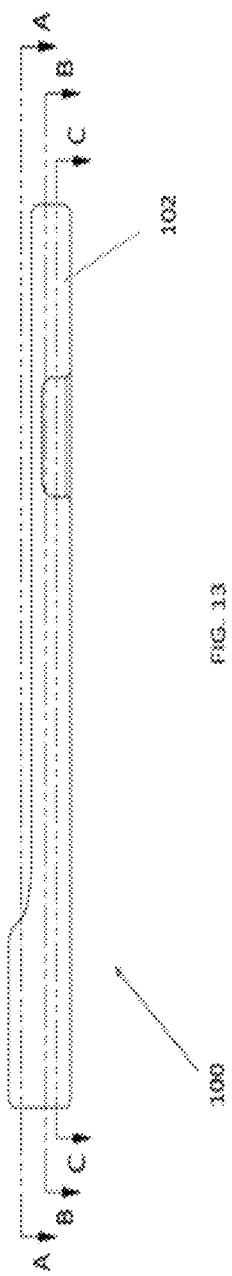
FIG. 13 is a side elevation view of a sound amplification device for an electronic device, in accordance with an embodiment.
Figure 14:
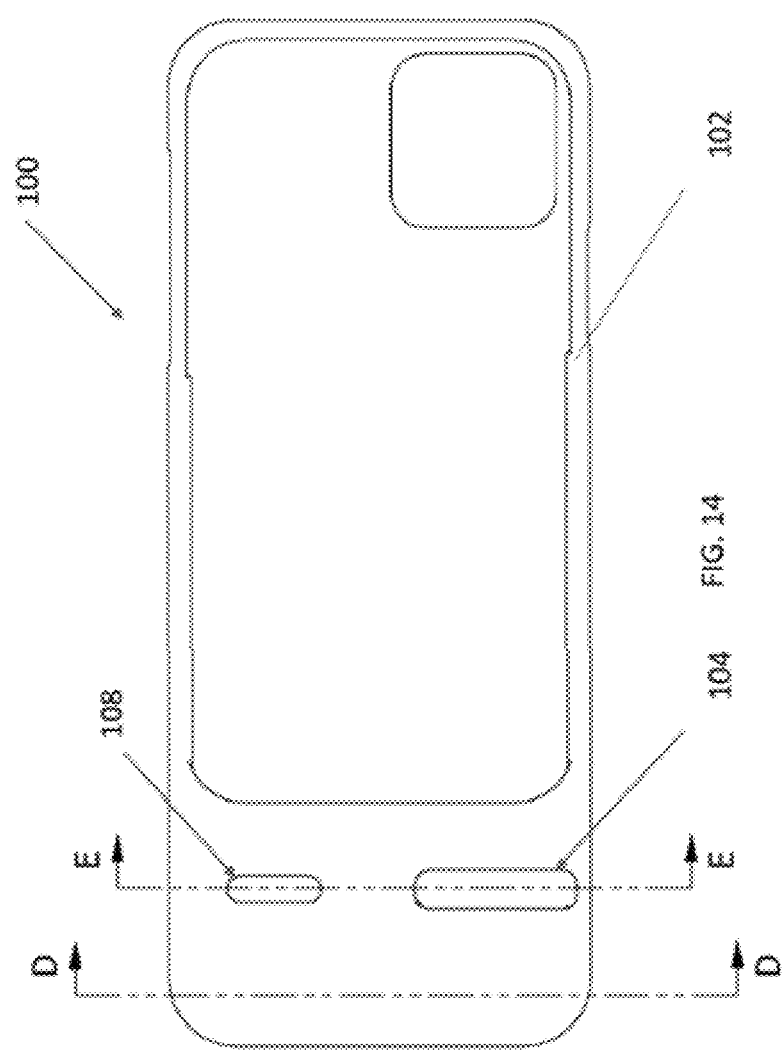
FIG. 14 is a top plan view of a sound amplification device for an electronic device, in accordance with an embodiment.
Figure 15:
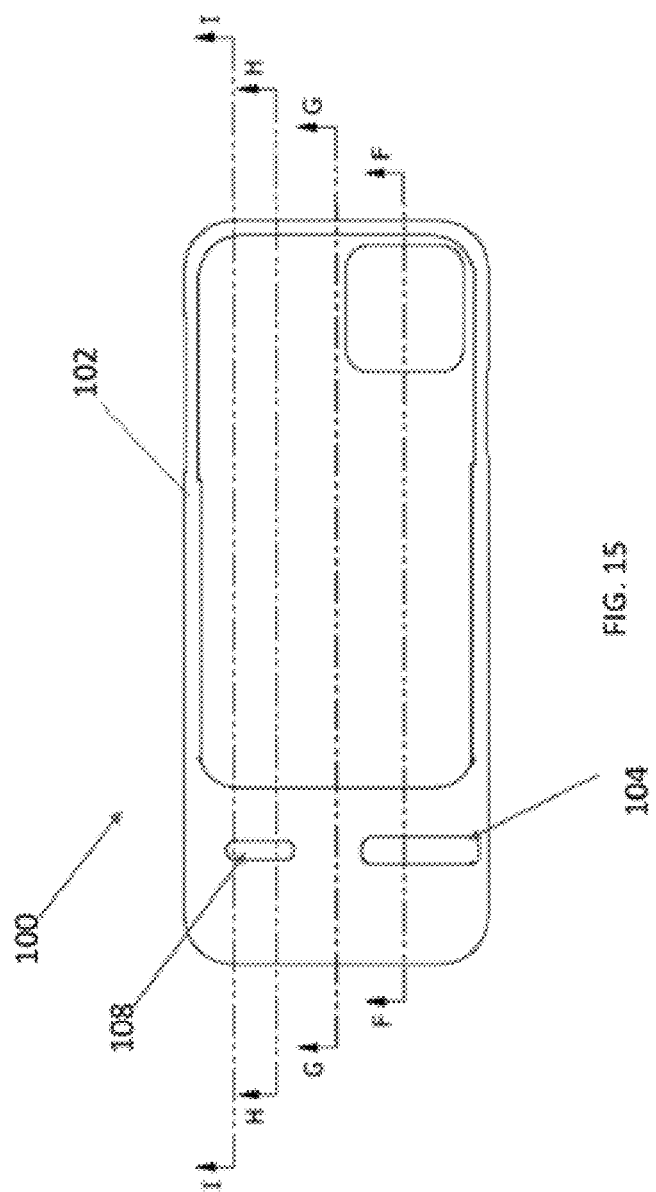
FIG. 15 is a top plan view of a sound amplification device for an electronic device, in accordance with an embodiment.
Figure 16:
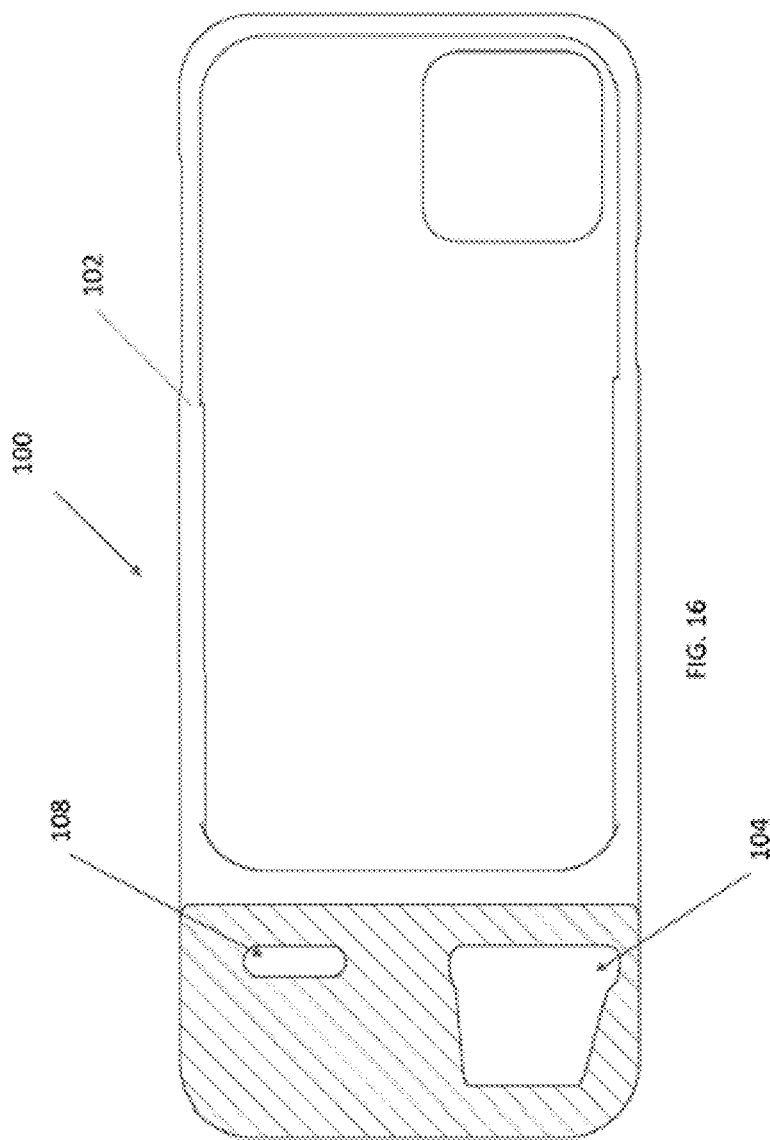
FIG. 16 is a cross-section view taken along section line A-A of FIG. 13, in accordance with an embodiment.
Figure 17:
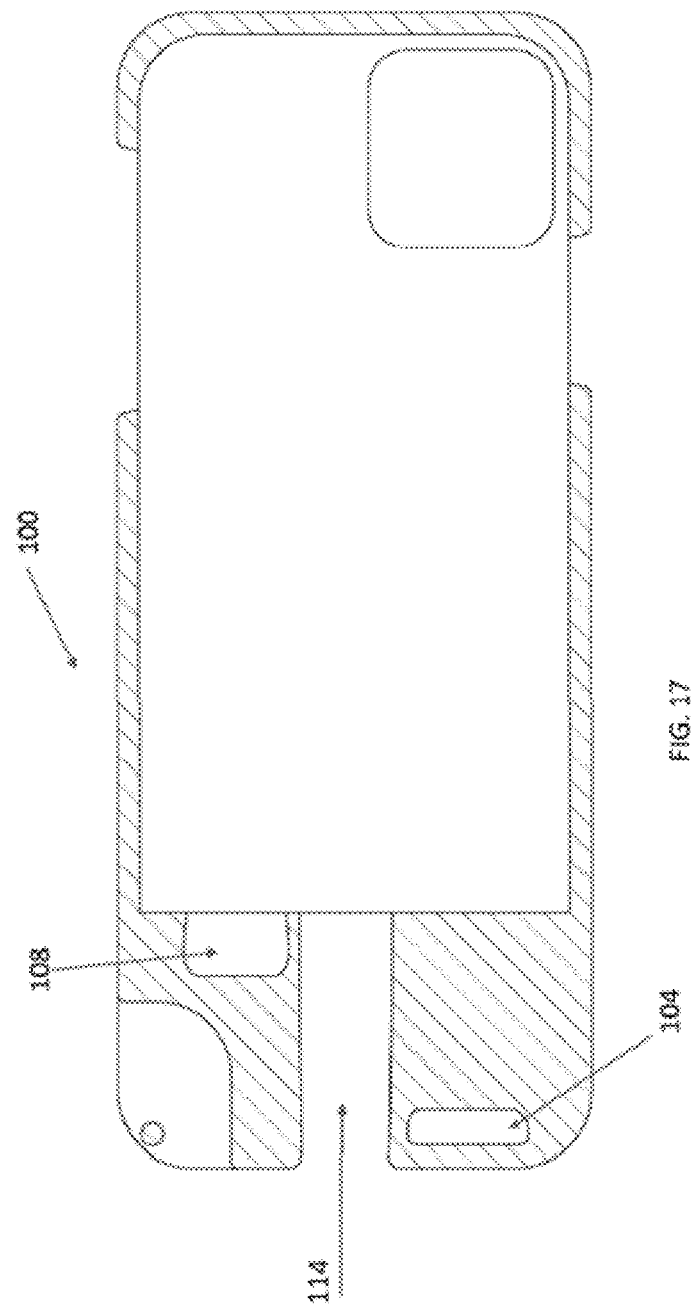
FIG. 17 is a cross-section view taken along section line B-B of FIG. 13, in accordance with an embodiment.
Figure 18:
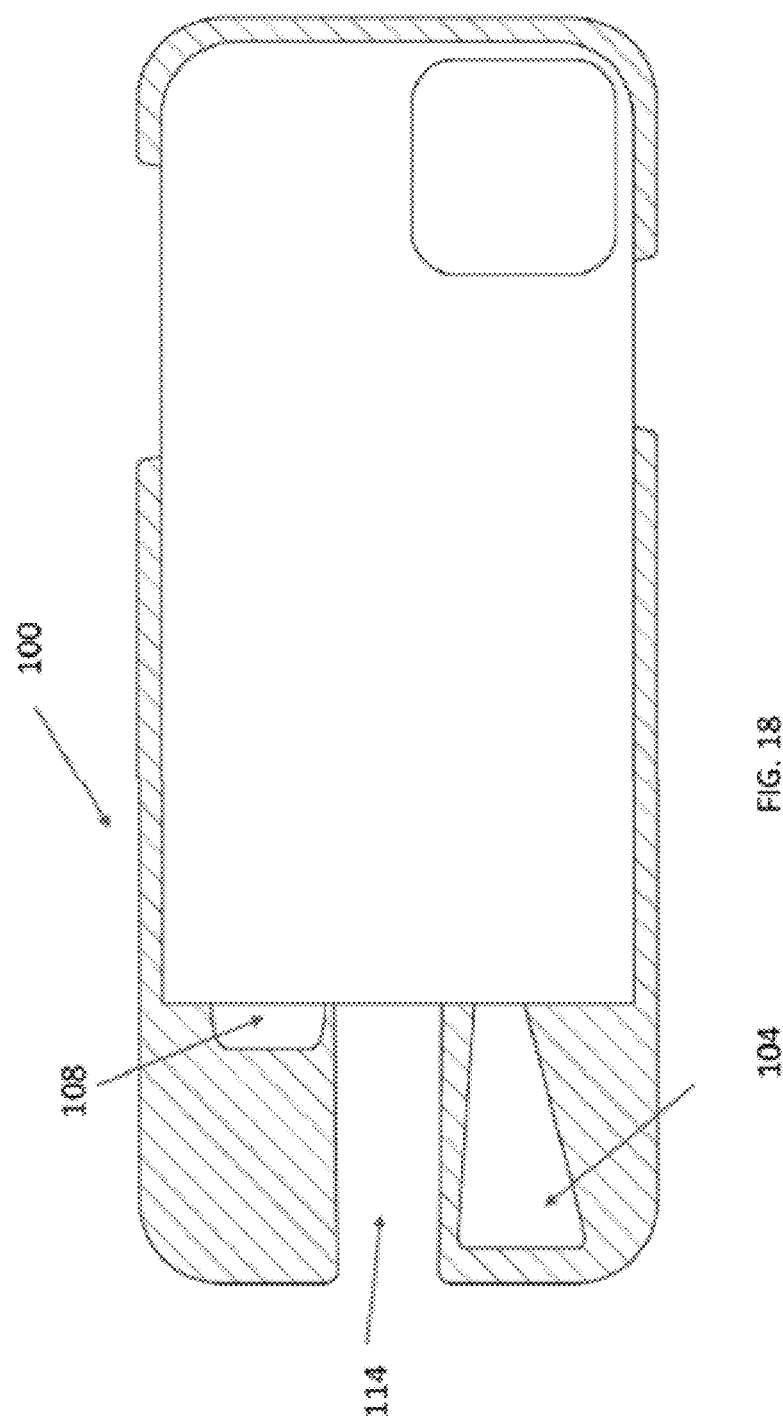
FIG. 18 is a cross-section view taken along section line C-C of FIG. 13, in accordance with an embodiment.
Figure 19:
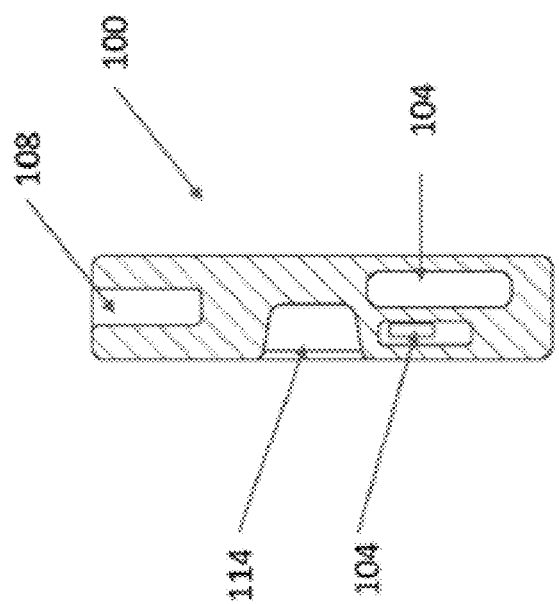
FIG. 19 is a cross-section view taken along section line D-D of FIG. 14, in accordance with an embodiment.
Figure 20:
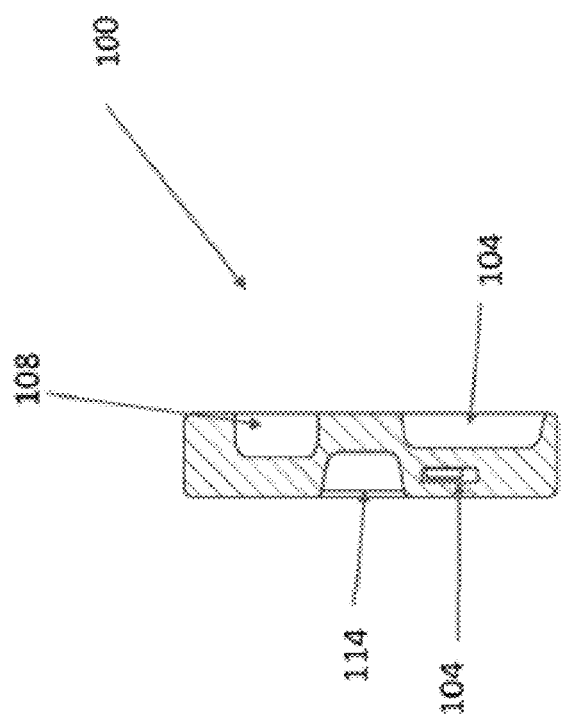
FIG. 20 is a cross-section view taken along section line E-E of FIG. 14, in accordance with an embodiment.
Figure 21:
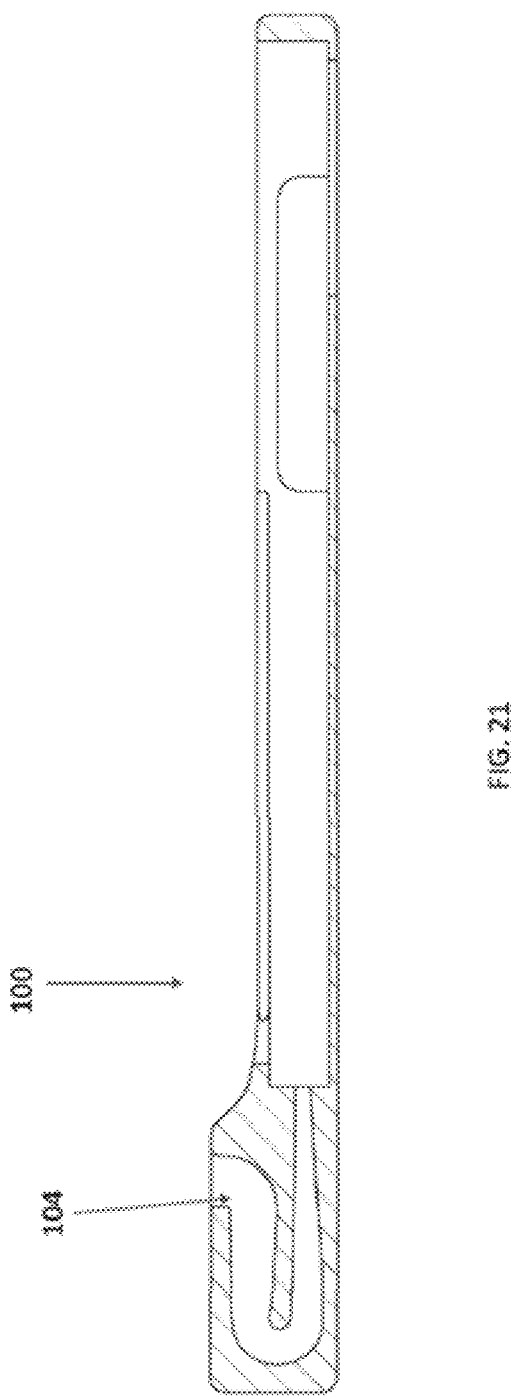
FIG. 21 is a cross-section view taken along section line F-F of FIG. 15, in accordance with an embodiment.
Figure 22:
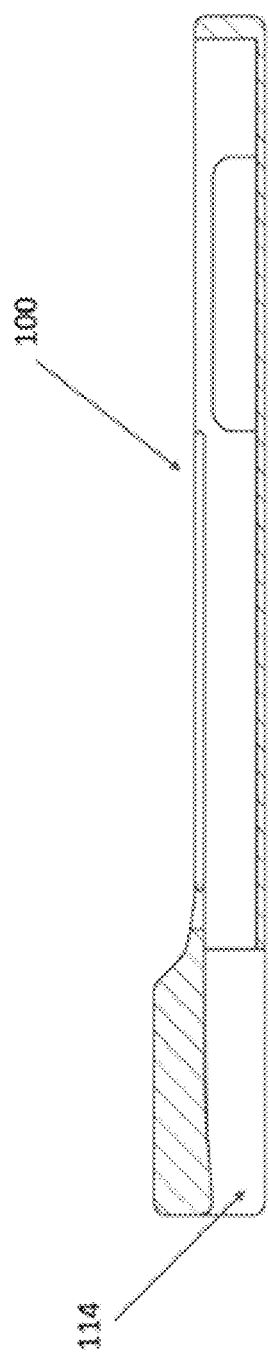
FIG. 22 is a cross-section view taken along section line G-G of FIG. 15, in accordance with an embodiment.
Figure 23:
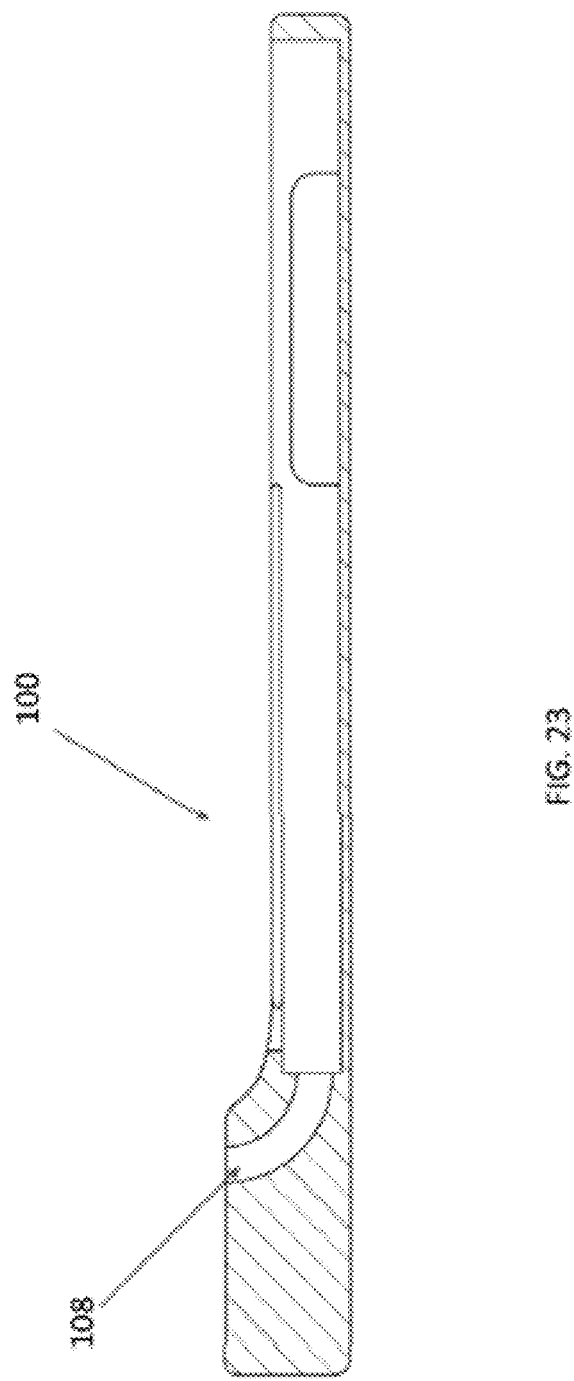
FIG. 23 is a cross-section view taken along section line H-H of FIG. 15, in accordance with an embodiment.

Referring to FIGS. 12A-12C, a manifold 206 can be attached to interface 202 by sliding it therein, and then multiple horns 204 can be attached to manifold 206. Sound can emanate through manifold 206 and escape through each of horns 204 to increase sound and extend frequency response.

Referring to FIGS. 13-24, a sound amplification device, designated generally by reference numeral 100, which is largely similar to sound amplification device 10 is shown. Regarding sound amplification device 100, an electronic device snaps into case 202 by manually inserting it through the front area, as is common with many phone cases. The bottom of device case 102, like case 20, includes the acoustic horn 104, similar to horn 36, (formed by baffling) that is positioned adjacent the speaker 18 when the electronic device 12 is contained within case 102. However, horn 104 curves in a serpentine manner back upon itself to increase its overall length. The mouth of horn 104 adjacent the speaker is smaller in dimension than the speaker opening in the electronic device in order to increase the sound pressure at the mouth, thus enhancing the amplification of the sounds emitted through horn 104. A serpentine sound passage created by horn 104 is formed in a diverging manner from the mouth of horn 104 to its exit through the front of case 102.

A sound gathering region 108 (formed by baffling) is formed in the interior of case 20 in the area adjacent microphone 16 and comprises a curved sound pathway of constant cross-sectional dimension; this acts in essentially the same manner as sound gathering region 42 An opening 110 formed on the front surface of case 102 permits incoming sound to enter the case and the sound gathering region 108 and direct the sound waves towards microphone 16 to enhance its reception.

Device 100 further includes a lanyard attachment point 112 formed on the bottom corner of the case. Also, a charging cable access port 114 is provided to permit a charging cable to be inserted and operatively attached to an electronic device held by the case. Further, a significant amount of water and dust repellent acoustic foam is inserted into the case, thereby adding a higher level of protection against water and dust without reducing the volume of sound.

In summary, the volume and intelligibility of voice is greatly improved. The microphone enhancement allows for hands free, clear remote speech. The combination of these improvements is especially beneficial to hearing impaired users and for conference call use.

When used in the standing position the bottom exit horn mouth design interacts with the supporting surface to further enhance the sound.

TV and movie sound improvement is especially useful in the horizontal position. The supporting stand is easy to use, stable in the vertical or horizontal. The charger can remain connected in either horizontal or the vertical position.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A sound amplification device for an electronic device having at least one speaker, a microphone, and a display surface, the sound amplification device comprising:
   a. a case in which the electronic device is adapted to be contained defined, in part, by a first wall positioned adjacent the at least one speaker when the electronic device is contained within the case;
   b, wherein a baffle is positioned within the first wall and forms an open pathway that diverges as it extends in a serpentine manner back upon itself from a mouth adjacent to a portion of the speaker and away therefrom.

2. The sound amplification device according to claim 1, wherein the at least one speaker has a predetermined size and the mouth has a predetermined size that is smaller in dimension than the predetermined size of the at least one speaker.

3. The sound amplification device according to claim 1, further comprising a second wall positioned adjacent the microphone when the electronic device is contained within the case, wherein sound waves are compressed as they approach the microphone.

4. The sound amplification device according to claim 1, further comprising a clip that moves between closed and open positions relative to the case and which permits, when in its open position, the electronic device to be moved into or out of the case, and when in its closed position, encloses the electronic device within the case and further provides a force against the electronic device that urges the electronic device into abutting relation with the first and second walls.

5. The sound amplification device according to claim 1, further comprising a stand that is pivotally connected to the case and permits the case to be placed on a surface such that the display surface of the electronic device is in a non-horizontal plane.

6. The sound amplification device according to claim 1, further comprising a lanyard attachment mechanism.

7. A sound amplification device for an electronic device having at least one speaker, a microphone, and a display surface, the sound amplification device comprising:
   a. a case in which the electronic device is adapted to be contained and defined, in part, by a first wall positioned adjacent the at least one speaker when the electronic device is contained within the case;
   b. an interface formed on the first wall and surrounding the position where the at least one speaker is contained within the sound amplification device, and a speaker opening formed through the first wall aligned with a baffle positioned within the first wall and aligned with the at least one speaker;
   c. a manifold adapted to be attached to the interface and comprising a sound channel through which sound waves can travel; and
   d. at least two sound horns adapted to be removably attached to the manifold and in surrounding relation to the speaker opening.

\* \* \* \* \*